United States Patent
Kingsbury et al.

(10) Patent No.: US 9,477,753 B2
(45) Date of Patent: Oct. 25, 2016

(54) CLASSIFIER-BASED SYSTEM COMBINATION FOR SPOKEN TERM DETECTION

(71) Applicant: INTERNATIONAL BUSINESS MACHINES CORPORATION, Armonk, NY (US)

(72) Inventors: Brian E. D. Kingsbury, Cortlandt Manor, NY (US); Hong-Kwang Jeff Kuo, Pleasantville, NY (US); Lidia Luminita Mangu, New York, NY (US); Hagen Soltau, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/796,670

(22) Filed: Mar. 12, 2013

(65) Prior Publication Data

US 2014/0278390 A1    Sep. 18, 2014

(51) Int. Cl.
*G10L 15/00*  (2013.01)
*G06F 17/30*  (2006.01)
*G10L 15/18*  (2013.01)
*G10L 15/32*  (2013.01)
(Continued)

(52) U.S. Cl.
CPC ....... *G06F 17/3074* (2013.01); *G10L 15/1822* (2013.01); *G10L 15/32* (2013.01); *G10L 25/54* (2013.01); *G10L 15/02* (2013.01); *G10L 15/083* (2013.01); *G10L 15/265* (2013.01); *G10L 2015/088* (2013.01)

(58) Field of Classification Search
CPC ... G10L 15/08; G10L 15/081; G10L 15/083; G10L 15/085; G10L 15/086; G10L 15/088; G10L 15/02; G10L 15/022; G10L 15/025; G10L 15/027; G10L 15/32
See application file for complete search history.

(56) References Cited

U.S. PATENT DOCUMENTS 5,619,410 A    4/1997  Emori et al.
5,754,978 A *  5/1998  Perez-Mendez ........ G10L 15/32
                                                    704/239

(Continued)

FOREIGN PATENT DOCUMENTS

WO    WO2009012056 A2    1/2009

OTHER PUBLICATIONS

Allauzen, C., et al. "General Indexation of Weighted Automata—Application to Spoken Utterance Retrieval" Proceedings of the Workshop on Interdisciplinary Approaches to Speech Indexing and Retrieval. May 2004. (8 Pages).

(Continued)

*Primary Examiner* — Richard Zhu
(74) *Attorney, Agent, or Firm* — Tutunjian & Bitetto, P.C.; Nidhi Kissoon

(57) ABSTRACT

Systems and methods for processing a query include determining a plurality of sets of match candidates for a query using a processor, each of the plurality of sets of match candidates being independently determined from a plurality of diverse word lattice generation components of different type. The plurality of sets of match candidates is merged by generating a first score for each match candidate to provide a merged set of match candidates. A second score is computed for each match candidate of the merged set based upon features of that match candidate. The first score and the second score are combined to provide a final set of match candidates as matches to the query.

25 Claims, 3 Drawing Sheets

(51) Int. Cl.
G10L 25/54 (2013.01)
G10L 15/08 (2006.01)
G10L 15/26 (2006.01)
G10L 15/02 (2006.01)

(56) References Cited

U.S. PATENT DOCUMENTS

| | | | | |
|---|---|---|---|---|
| 6,122,613 | A * | 9/2000 | Baker | G10L 15/22 704/235 |
| 6,292,779 | B1 * | 9/2001 | Wilson | G10L 15/26 704/255 |
| 6,618,702 | B1 * | 9/2003 | Kohler et al. | 704/250 |
| 6,701,293 | B2 * | 3/2004 | Bennett | G10L 15/32 704/246 |
| 7,228,275 | B1 * | 6/2007 | Endo et al. | 704/235 |
| 7,590,605 | B2 * | 9/2009 | Josifovski | G06F 17/30265 704/236 |
| 7,603,275 | B2 | 10/2009 | Tavares | |
| 7,831,425 | B2 * | 11/2010 | Acero | G10L 15/05 704/231 |
| 8,010,471 | B2 * | 8/2011 | Zhang et al. | 706/45 |
| 8,015,007 | B2 * | 9/2011 | Sakai | G10L 15/193 704/240 |
| 2003/0115053 | A1 * | 6/2003 | Eide | G10L 15/32 704/231 |
| 2004/0199385 | A1 * | 10/2004 | Deligne et al. | 704/235 |
| 2005/0005240 | A1 * | 1/2005 | Reynar et al. | 715/533 |
| 2009/0089236 | A1 * | 4/2009 | Lamprecht et al. | 706/46 |
| 2010/0004930 | A1 * | 1/2010 | Strope et al. | 704/240 |
| 2011/0015925 | A1 * | 1/2011 | Xu | G10L 15/20 704/233 |
| 2011/0137648 | A1 * | 6/2011 | Ljolje | G10L 15/285 704/231 |
| 2012/0101817 | A1 * | 4/2012 | Mocenigo et al. | 704/231 |

OTHER PUBLICATIONS

Bulyko, I., et al. "Detection of Unseen Words in Conversational Mandarin" 2012 IEEE International Conference on Acoustics, Speech and Signal Processing. Mar. 2012. pp. 5181-5184.
Can, D., et al. "Effect of Pronunciations on OOV Queries in Spoken Term Detection" Proceedings of the IEEE International Conference on Acoustics, Speech, and Signal Processing, ICASSP 2009. Apr. 2009. pp. 3957-3960.
Chen, S., et al. "An Empirical Study of Smoothing Techniques for Language Modeling" TR-10-98, Computer Science Group, Harvard University. Aug. 1998. pp. 1-63.
Fiscus, J., et al. "Results of the 2006 Spoken Term Detection Evaluation" SIGIR 2007 Workshop Searching Spontaneous Conversational Speech. 2007. (7 Pages).
Glorot, X., et al. "Understanding the Difficulty of Training Deep Feedforward Neural Networks" Journal of Machine Learning Research—Proceedings Track, vol. 9. Mar. 2010. pp. 249-256.

Han, C., et al. "Phone Mismatch Penalty Matrices for Two-Stage Keyword Spotting Via Multi-Pass Phone Recognizer" 11th Annual Conference of the International Speech Communication Association. Sep. 2010. pp. 202-205.
Kingsbusry, B., et al. "Scalable Minimum Bayes Risk Training of Deep Neural Network Acoustic Models Using Distributed Hessian-Free Optimization" 13th Annual Conference of the International Speech Communication Association. Sep. 2012. (4 Pages).
Martens, J. "Deep Learning Via Hessian-Free Optimization" Proceedings of the 27th International Conference on Machine Learning. Jun. 2010. (8 Pages).
Mertens, T., et al. "Merging Search Spaces for Subword Spoken Term Detection" 10th Annual Conference of the International Speech Communication Association. Sep. 2009. pp. 2127-2130.
Miller, D., et al. "Rapid and Accurate Spoken Term Detection" 8th Annual Conference of the International Speech Communication Association. Aug. 2007. pp. 314-317.
Ng, T., et al. "Developing a Speech Activity Detection System for the DARPA Rats Program" 13th Annual Conference of the International Speech Communication Association. Sep. 2012. (4 Pages).
Parada, C., et al. "Query-By-Example Spoken Term Detection for OOV Terms" 2009 IEEE Workshop on Automatic Speech Recognition & Understanding. Dec. 2009. pp. 404-409.
Parlak, S., et al. "Spoken Term Detection for Turkish Broadcast News" Proceedings of the IEEE International Conference on Acoustics, Speech, and Signal Processing. Mar. 2008. pp. 5244-5247.
Povey, D., et al. "Boosted MMI for Model and Feature-Space Discriminative Training" Proceedings of the IEEE International Conference on Acoustics, Speech, and Signal Processing. Apr. 2008. (4 Pages).
Soltau, H., et al. "Dynamic Network Decoding Revisited" 2009 IEEE Workshop on Automatic Speech Recognition & Understanding. Dec. 2009. pp. 276-281.
Soltau, H., et al. "Advances in Arabic Speech Transcription at IBM Under the DARPA GALE Program" IEEE Transactions on Audio, Speech & Language Processing, vol. 17. No. 5. Jul. 2009. pp. 884-894.
Szoke, I., et al. "Sub-Word Modeling of Out of Vocabularywords in Spoken Term Detection" 2008 IEEE Spoken Language Technology Workshop. Dec. 2008. pp. 273-276.
Tejedor, J., et al. "A Posterior Probability-Based System Hybridisation and Combination for Spoken Term Detection" 10th Annual Conference of the International Speech Communication Association. Sep. 2009. pp. 2131-2134.
Vergyri, D., et al. "The SRI/OGI 2006 Spoken Term Detection System" 8th Annual Conference of the International Speech Communication Association. Aug. 2007. pp. 2393-2396.
Zhang, B., et al. "White Listing and Score Normalization for Keyword Spotting of Noisy Speech" 13th Annual Conference of the International Speech Communication Association. Sep. 2012. (4 Pages).

* cited by examiner

300

Determine a plurality of sets of match candidates for a query, each of the plurality of sets of match candidates being independently determined from a plurality of diverse word lattice generation components of different type
302

The diverse word lattice generation components of different type including at least one of acoustic models, decoding method, audio segmentation and training data set
304

Merge the plurality of sets of match candidates by generating a first score for each match candidate to provide a merged set of match candidates
306

Normalize the scores for each match candidate
308

Compute a second score for each match candidate of the merged set based upon features of that match candidate
310

Training a classifier with the features to compute the second score
312

Features include at least one of keyword specific features, system specific feature, and general features
314

Combine the first score and the second score to provide a final set of match candidates
316

FIG. 3

CLASSIFIER-BASED SYSTEM COMBINATION FOR SPOKEN TERM DETECTION

GOVERNMENT RIGHTS

This invention was made with Government support under Contract No.: D11PC20192 awarded by the Defense Advanced Research Projects Agency (DARPA). The Government has certain rights in this invention.

BACKGROUND

1. Technical Field

The present invention relates to spoken term detection, and more particularly to a classifier-based system combination for spoken term detection.

2. Description of the Related Art

Spoken term detection is an important aspect in speech recognition systems. A goal of spoken term detection is to find all occurrences of a term or consecutive sequence of terms (or keywords) from a large collection of audio recordings. However, current approaches to spoken term detection use either only a single spoken term detection system, or combine multiple components of a spoken term detection system by summing up their scores. In combining multiple components of a system, the current approaches to spoken term detection do not consider individual features of each of the system components.

SUMMARY

A method for processing a query includes determining a plurality of sets of match candidates for a query using a processor, each of the plurality of sets of match candidates being independently determined from a plurality of diverse word lattice generation components of different type. The plurality of sets of match candidates is merged by generating a first score for each match candidate to provide a merged set of match candidates. A second score is computed for each match candidate of the merged set based upon features of that match candidate. The first score and the second score are combined to provide a final set of match candidates as matches to the query.

A method for processing a query includes determining a plurality of sets of match candidates for a query using a processor, each of the plurality of sets of match candidates being independently determined from a plurality of diverse word lattice generation components of different type including at least one of acoustic model, decoding technique, audio segmentation, and training data type. The plurality of sets of match candidates is merged by generating a first score for each match candidate to provide a merged set of match candidates. A second score is computed for each match candidate of the merged set by training a classifier based upon at least one of keyword features and system features of that match candidate. T first score and the second score are combined to provide a final set of match candidates as matches to the query.

A system for processing an audio query includes a keyword search engine module configured to determine a plurality of sets of match candidates for a query using a processor, each of the plurality of sets of match candidates being independently determined from a plurality of diverse word lattice generation components of different type stored on a computer readable storage medium. A combination module is configured to merge the plurality of sets of match candidates by generating a first score for each match candidate to provide a merged set of match candidates. A classifier module is configured to compute a second score for each match candidate of the merged set based upon features of that match candidate. The combination module is further configured to combine the first score and the second score to provide a final set of match candidates as matches to the query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a block/flow diagram showing a system/method for spoken term detection, in accordance with one illustrative embodiment.

DETAILED DESCRIPTION OF PREFERRED EMBODIMENTS

Figure 1:
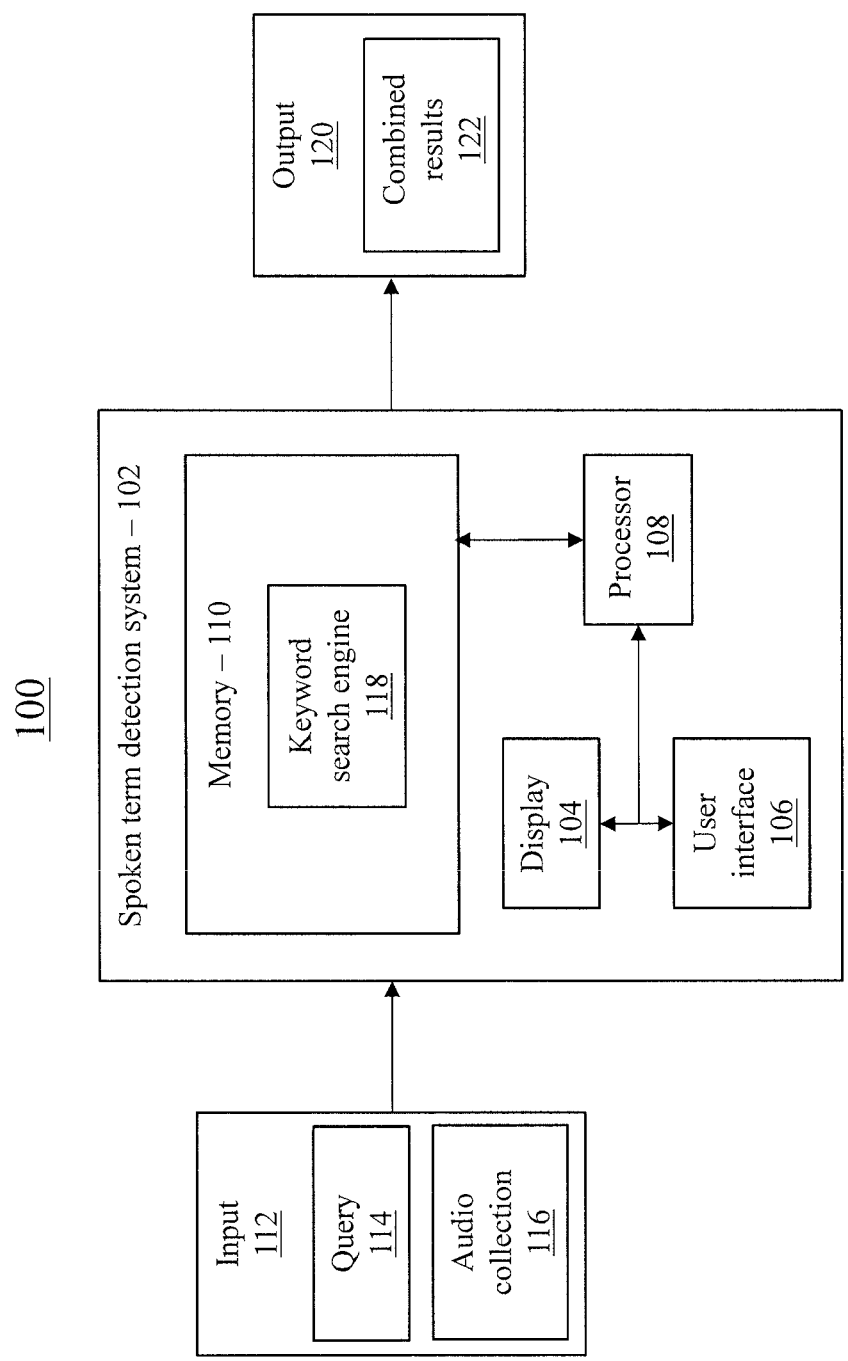
FIG. 1 is a high level block/flow diagram showing a system/method for spoken term detection, in accordance with one illustrative embodiment.

In accordance with the aspects of the invention, systems and methods for a classifier-based system combination for spoken term detection are provided. A plurality of sets of match candidates is first determined for a query. One goal is to determine match candidates of the query from a collection of audio. Preferably, the plurality of sets of match candidates is determined from a plurality of diverse word lattice generation components of different type. The plurality of diverse word lattice generation components of different type may include different types of, e.g., acoustic models, decoding techniques, audio segmentation, and training data type. The plurality of sets of match candidates is merged by generating a first score for each match candidate to provide a merged set of match candidates. Generating a first score may include a linear combination method, which normalizes scores for each match candidate.

A second score is then computed for each match candidate of the merged set based upon features of that match candidate. Preferably, the second score is computed by training a classifier with the features. The classifier receives the merged set to provide the second score. Preferably, the features include keyword specific features, system features, and general features. The first score and the second score are combined by, e.g., multiplication, to provide the final set of match candidates, which may be based upon a predefined threshold.

By combining results based on diverse word lattice generation components of different type, the aspects of the present invention have been found to provide improvements in efficiency and accuracy.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a high level block/flow diagram showing a system for spoken term detection 100 is illustratively depicted in accordance with one embodiment. The spoken term detection system 100 improves over current approaches by diversifying the Automatic Speech Recognition engines used for indexing and combining the search results.

The system 100 may include a system or workstation 102. The system 102 preferably includes one or more processors 108 and memory 110 for storing applications, modules and other data. The system 102 may also include one or more displays 104 for viewing. The displays 104 may permit a user to interact with the system 102 and its components and functions. This may be further facilitated by a user interface 106, which may include a mouse, joystick, or any other peripheral or control to permit user interaction with the system 102 and/or its devices. It should be understood that the components and functions of the system 102 may be integrated into one or more systems or workstations.

The system 102 may include a stand-alone device or may be incorporated as part of a device. For example, the system 102 may be incorporated in a, e.g., mobile phone, telephone, personal digital assistant, tablet computer, automobile, media player, television, search engine, etc. The stand-alone device may include a handheld device or portable device. Other embodiments are also contemplated.

System 102 receives an input 112, which may include, e.g., an audio collection to be searched 116 and a query 114 (e.g., audio, text). The query 114 and/or the audio collection 116 may also include other types of inputs and/or files, such as, e.g., text documents, videos, images, etc. One goal of system 102 is to determine possible matches of a query 114 from a collection of, e.g., audio files 116. Audio collection 116 may be processed by keyword search engine 118, which is shown in more detail in FIG. 2.

Figure 2:
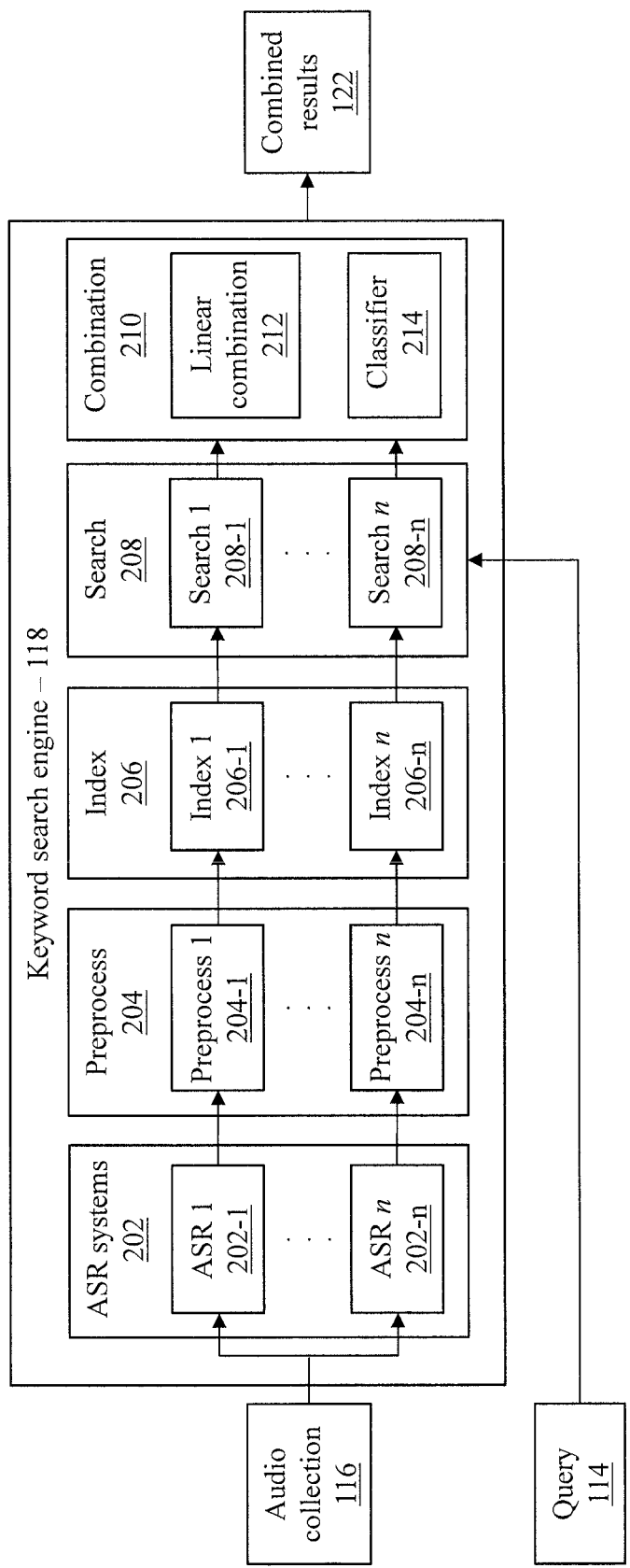
FIG. 2 is a block/flow diagram showing a system/method for a keyword search engine, in accordance with one illustrative embodiment.

Referring now to FIG. 2, with continued reference to FIG. 1, a block/flow diagram showing a system for keyword search engine 118 is illustratively depicted in accordance with one embodiment. The audio collection 116 is processed by keyword search engine 118 to provide a plurality of lists of candidates to the query 114. Keyword search engine 118 may include ASR (automatic speech recognition) and/or LVCSR (large vocabulary continuous speech recognition) systems 202 to provide a word lattice for each audio segment of audio collections 116. Preferably, ASR systems 202 include a plurality of diverse ASR systems 202-1, ..., 202-n run independently in parallel. The plurality of ASR systems 202 is preferably of different type. The plurality of ASR systems 202 of different type may include a different type of, e.g., acoustic model, decoding technique, audio segmentation, training data type, etc., as will be discussed in more detail hereinafter. In one embodiment, each ASR system 202 follows the transcribe-and-match strategy, in which the audio collection 116 is processed by an ASR system 202 to provide a word lattice for each audio segment. Other implementations of ARS systems 202 are also contemplated. A word lattice is provided as a representation of multiple word hypotheses in a directed acyclic graph (DAG), where each node is associated with a time instant and each edge is associated with input and output labels representing words.

Preprocess module 204 converts the word lattices from each ASR system 202 into phonetic WFSTs (weighted finite-state transducers), in which the input labels are phones, the output labels are the starting times of phones, and the costs are phone negative log posteriors. Specifically, a pronunciation dictionary maps words to phone sequences. The resulting utterance WFSTs are used (1) as the starting point for creating the index, and (2) for retrieving the time marks of the hits during the search phase. It is noted that preprocess module 204 may include a single preprocess module or multiple preprocess modules 204-1, ..., 204-n, e.g., for each ASR system 202.

Index module 206 converts the utterance WFSTs from the preprocessing module 204 into an index WFST. Index module 206 may include a single index module or multiple index modules 206-1, ..., 206-n. In one embodiment, indexing may be performed as follows; however, other indexing techniques may also be applied. First, time information is eliminated from the utterance WFSTs and the output labels for the arcs in the transducers, which previously contained the time information, become epsilon $\epsilon$, where $\epsilon$ represents the empty string. Then, for each utterance WFST, a new start node S is created and connected to all the original nodes n. The weight of the arc from S to n is the posterior probability of reaching node n from the original start node s of the WFST (i.e., the shortest distance in log semiring between s and n). The input and output labels of the arc from S to n are both epsilon. Finally, for each utterance WFST, a new end node E is created and all the original nodes n are connected to it. The weight of the arc from n to E is the posterior probability of reaching the end node e of the original WFST from n (i.e., the shortest distance in log semiring between n and e). The arc from n to E has an input label epsilon and output label the lattice id. The index WFST is the union of all the utterance WFSTs.

Search module 208 performs WFST-based keyword search. Search module 208 may include a single search module or multiple search modules 208-1, ..., 208-n. A query WFSA (weighted finite-state automaton) is constructed based upon the input query q 114. A pronunciation dictionary is used for IV (in-vocabulary) queries and a letter-to-sound model is used for OOV (Out of Vocabulary) queries. Multiple pronunciations are compactly represented by the query WFSA. In the Levantine Arabic system, the pronunciations are grapheme based: the pronunciation of a word is its letter sequence. Therefore, the pronunciation for both IV and OOV words can be generated in the same way, which is represented as letter to sound transducers L2S. A fuzzier search, which may improve recall while degrading precision, can also be accomplished using query expansion. Specifically, the probabilities of phone-to-phone confusions are estimated and a confusability model is created as the phone-to-phone transducer P2P. Given a query q 114, the query WFSA Q is obtained via composition:

$$Q = n\text{best}(q \circ L2S \circ P2P). \quad (1)$$

Varying the number of hypotheses kept after the composition (NbestP2P) controls the degree of query expansion, trading off between precision and recall.

The phone confusability transducer (i.e., phone-to-phone transducer P2P) should be trained to model the behavior of the ASR system when it is used to index new audio data. Thus, it is important to collect the confusability statistics on data that was not used for ASR training. During experimentation, two 10-hour subsets of clean (transmitted) training audio were used. Separate models were trained based on each 10-hour subset, and statistics were collected for each model based on the other 10-hour subset. The acoustic model was a deep neural network model taking 13 frames of 40-dimensional PLP (perceptual linear predictive)+LDA (linear discriminant analysis)+STC (semi-tied covariance) features as input, containing four hidden layers of 512 hyperbolic target units each, and estimating posterior probabilities for 144 context-independent HMM (hidden Markov model) state targets.

To produce a final hit list, search module 208 preferably performs a 2-step search in which the lattices containing the query are first found by searching the WFST index for the composed query WFST Q. Then, the relevant utterance WFSTs from preprocess module 204 are identified to obtain the start and end time information for the hits. Other search techniques may also be employed.

After producing a list of hits and the associated scores for each ASR branch, combination module 210 merges the results to provide combined results 122 as a ranked list of term occurrences. Combined results 122 may be provided as output 120 of the system 102. Two different approaches are considered for merging results: (1) linear combination of the scores followed by a normalization step; and (2) classifier-based combination. The classifier-based combination was found to produce better results.

In the first approach, linear combination module 212 is configured to employ linear combination of scores followed by a normalization step. For each keyword, the union of all hits from all systems is first found. A final list is provided by the following procedure: (1) a hit which does not overlap with any other hit is copied to the final list, while (2) a set of overlapping hits corresponding to the same keyword is merged into one hit in the final list which has the time marks of the highest scoring hit and a score that is the sum of the hit scores. After providing the final list of hits, the scores are normalized per keyword: for each keyword, the scores for all the hits are summed and each score is divided by this sum. This normalization step was found to result in significant improvements.

In the second approach, classifier module 214 is configured to perform a classifier-based combination. The classifier preferably includes, e.g., a conditional maximum-entropy (MaxEnt) model; however, other classifiers may also be employed. The input to the MaxEnt classifier is the merged hit list with the associated total scores, e.g., from linear combination module 212. For each hit in the list, three types of features are considered: (1) keyword specific features, such as, e.g., the number of phones and the number of words; (2) system specific features, such as, e.g., the system score, rank of the score among all the hits for a specific keyword, and the rank of the duration of the hit (after computing max and min duration for the particular hit produced by the system); and (3) general features, such as, e.g., the number of systems voting for a hit, the rank of the duration across all hits, and the total score after combining using the linear combination approach, before and after normalization. Aside from the system scores and the total score, all other features have discrete values. The continuous values are discretized by binning into k equal bins, where k is optimized. Other binning techniques may also be applied. The MaxEnt classifier is trained based upon these features to produce a new score for each hit in the merged list. A final score is computed by multiplying the maximum-entropy score with the original total score.

Having assigned a final score to each keyword hit hypothesis, the final list of hits may be selected based on a given discrimination threshold. In one embodiment, the chosen hits are those whose final scores exceed the discrimination threshold. Each ASR branch can be evaluated by computing the probability of a miss, p(Miss) defined as $$\frac{\sum_i \text{\#times keyword } i \text{ is missed}}{\sum_i \text{\#occurrences of keyword } i}$$

and the probability of false alarm p(FA) defined as $$\frac{\text{\#false alarms}}{\text{\#total words} \times \text{\#keywords}}.$$

By varying the discrimination thresholds, a receiver operating characteristic (ROC) curve can be generated for a spoken term detection system on a test set. The performance of different spoken term detection systems may be evaluated by comparing their ROC curves. For a fixed p(FA) operating point, the best system is the one that gives the lowest p(Miss), and vice versa. One can also use a metric like F-measure to compare different systems. Other metrics are also contemplated.

Aspects of the invention perform keyword search to provide a hit list by using different indexes and combining the result. Index diversity is achieved in ASR systems 202 based on lattice generation components of different type of: (1) acoustic model type, such as, e.g., a Gaussian mixture model (GMM) or deep neural network (DNN); (2) decoding techniques, which can be either dynamic or static; (3) audio segmentation techniques; and (4) training data set, which can either use only noisy data (N), or combine the noisy and clean data (N+C). Experimental setups incorporating such diversity will be discussed hereafter, in accordance with different embodiments.

An acoustic model is a statistical relationship between audio and their text transcripts. GMM acoustic models may include a conventional unvowelized model (GMM-U) and a Buckwalter vowelized model (GMM-V). The front end features for both models may be based on VTL (vocal tract length)-warped PLP features with a context window of 9 frames. Speaker based cepstral mean and variance normalization was applied, followed by an LDA transform to reduce the feature dimensionality to 40. The ML (machine learning) training of the acoustic model was interleaved with estimations of a global STC transform. FMLLR (feature space maximum likelihood linear regression) speaker adaption was applied both in training and testing, while MLLR regression trees were applied only during run-time. The total number of Gaussian components is 120,000, distributed over 7000 quinphone context-dependent states. Feature and model level discriminative training uses the boosted maximum mutual information (bMMI) criterion.

A DNN acoustic model uses a feature processing pipeline similar to that used for the GMM-U and GMM-V acoustic models, with the primary differences being a Mel filter bank that only passes frequencies between 250-3000 Hz and no VTL normalization (VTLN). The LDA+STC transform and speaker-dependent FMLLR transforms are inherited from an auxiliary GMM acoustic model that is independent of GMM-U and GMM-V models. The DNN takes 13 consecutive frames of 40-dimensional PLP+LDA+STC+FMLLR features as input, contains four hidden layers of 512 hyperbolic tangent units each, and estimates posterior probability for 4096 quingrapheme context-dependent HMM states. It therefore contains 3.2M trainable parameters.

The DNN model is initialized with random weights using the normalized initialization, in which the initial weight in layer j, $W_j$, are drawn from a specific uniform distribution $W_j \sim U[-\sqrt{6/n_j+n_{j+1}}, \sqrt{6/n_j+n_{j+1}}]$, where $n_j$ is the fan-in to layer j and $n_{j+1}$ is the fan-out. Following initialization, the DNN is trained using stochastic gradient descent with a cross-entropy (CE) loss function. Following CE training, the DNN is trained in a sequence-discriminative fashion, using the state-level minimum Bayes risk (sMBR) criterion and a distributed implementation of Hessian-free training.

Decoding of audio identifies a most likely transcription of an utterance of the audio by generating word lattices from audio inputs. Two different decoding techniques have been considered. A static decoder is based on a fully precompiled search network that is heavily optimized at compile time through determinization and minimization. To use the full language model, the decoder generates lattices using a small LM (linear model) and then rescores them with a full LM. Lattice generation is performed by propagating multiple search tokens corresponding to different LM histories during the forward pass. At merge points, only the top N tokens (or backpointers) are kept.

In the dynamic decoding, the language model is applied dynamically. The search network, representing the search vocabulary, is precompiled at the HMM level, with sharing of common prefixes and suffixes. Word labels are pushed forward as far as possible to allow for early path recombination. Lattice generation for the dynamic decoder is a conversion of the backpointer table to a lattice. Extra arcs are created between matching backpointers (those with the same start and end times and cross-word context). Two criteria are used to limit the number of arcs: beam pruning, which is based on the arc posterior, and rank pruning, which limits the number of outgoing arcs per lattice state. This approach produces very rich lattices with minimal overhead (less than 10%) over regular Viterbi search.

Audio segmentation breaks down the audio collection into segments. Three audio segmentation variants have been considered. The first audio segmentation variant (S1) is a combination of multiple audio segmentation techniques, all of which are based on Viterbi decoding with 3 states corresponding to speech, silence and no-transmission. These segmentations differ in their acoustic models and features. S1 uses channel-dependent GMMs and neural networks trained by a 40-dimensional LDA feature space obtained by projecting consecutive PLP cepstra within a time window of +/−4 frames. Both GMMs and neural networks are estimated with BMMI using an asymmetric loss that only penalizes false alarms. During segmentation, the scores from the GMMs and the neural networks are log-linearly combined at the frame level. Channel detection is performed by selecting the channel with the highest likelihood after decoding with a set of 8 GMMs trained with maximum likelihood.

The second segmentation variant (S2) is based on the same Viterbi decoding, but uses 2 states corresponding to speech and non-speech. Another difference is that the segmentation models are derived from a full-resolution channel- and speaker-independent acoustic model via k-means clustering. The third segmentation variant (S3) is similar to S2, save for the tuning strategy. Tuning may include varying parameters to provide a desired (e.g., best) result. Parameters may include, e.g., acoustic weight, maximum duration for each segment, etc.

Aspects of the present invention were experimentally evaluated. Table 1 shows illustrative combinations of five systems, in accordance with one embodiment. The first four columns refer to the dimensions of diversity described above. The last column shows the value of NbestP2P that was used for in-vocabulary keyword search. For OOV queries, all systems use NbestP2P=10000.

TABLE 1 combinations of diversity

| System | Acoustic Model | Segmentation | Decoding | Data | NbestP2P |
|---|---|---|---|---|---|
| Sys1 | GMM-V | S1 | dynamic | N | 50 |
| Sys2 | DNN | S1 | dynamic | N | 1 |
| Sys3 | GMM-V | S2 | static | N | 50 |
| Sys4 | GMM-U | S2 | dynamic | N + C | 1 |
| Sys5 | GMM-U | S3 | static | N + C | 1 |

The word lattice in the five systems in Table 1 were found to be heavily pruned and were about 10 times smaller than what is typically used for speech recognition. Diversity in lattice generation not only improved the performance of the system, but also reduced the size of the final index and, consequently, the retrieval time. The final combined system was found to be up to 3 times better than conventional approaches.

In some embodiments, different types and combinations of word lattice generation components of ASR 202 may be selected in accordance with different criteria. For example, different types and combinations of word lattice generation components may be selected according to characteristics of the individual (e.g., sex, age, ethnicity, accent, language, etc.), transmission channel (e.g., cell phone, landline, etc.), recording conditions (e.g., recordings from a mobile phone, using a microphone, etc.), etc. Other criteria are also contemplated.

Aspects of the invention provide for diversifying the ASR engines for indexing and combining the search results. By diversifying acoustic models, search strategies, audio segmentation, and keyword preprocessing, different results are obtained for each ASR branch, resulting in significant improvements after combination.

Referring now to FIG. 3, a block/flow diagram showing a method for processing an audio file 300 is illustratively depicted in accordance with one embodiment. In block 302, a plurality of sets of match candidates are determined for a query (e.g., audio, text, etc.). Preferably, each of the plurality of sets of match candidates are independently determined from a plurality of diverse word lattice generation components of different type. The plurality of diverse word lattice generation components may be independent run, e.g., in parallel to convert an audio collection to be searched into word lattices.

Word lattices may be converted into utterance WFSTs having input labels as phones, output labels as starting times of the phones, and costs as phone negative log posteriors. Utterance WFSTs may then be converted into an index WFST, wherein the index WFST is the union of all utterance WFSTs. A search may be performed to identify match candidates from each ASR branch to provide a plurality of sets of match candidates. Preferably, the search includes composing a query WFST, identifying lattices containing the query WFST from the index WFST, and obtaining start and end time information for each match candidate from utterance WFSTs.

Preferably, the plurality of diverse word lattice generation components are of different types. In block 304, the plurality of diverse word lattice generation of different type includes at least one of acoustic model, decoding methods, audio segmentation, and training data set. The acoustic model type may include, e.g., a GMM (e.g., GMM-U, GMM-V) or DNN. Decoding methods may include, e.g., a static or dynamic decoding. Audio segmentation may include, e.g., segmenting based upon 3 states: speech, silence and no-transmission; segmenting based upon 2 states: speech and non-speech; and segmenting with tuning. Training data may include, e.g., noisy data, and a combination of noisy and clean data. Other types of diversity are also contemplated.

In some embodiments, combinations of diverse word lattice generation components of different type are selected in accordance with criteria. For example, combinations of diverse word lattice generation components of different type may be selected according to characteristics of the individual, transmission channel, recording conditions, etc. Other criteria are also contemplated.

In block 306, the plurality of sets of match candidates is merged by generating a first score for each match candidate to provide a merged set of match candidates. In one embodiment, merging the plurality of sets includes determining the union of all match candidates from the plurality of sets. A match candidate which does not overlap with other match candidates is copied to the merged set. Overlapping match candidates are merged into a single match candidate in the merged set, having time marks of the highest scoring match candidate and a score of the average of the overlapping match candidates. In block 308, scores are normalized for each match candidate. Normalizing may include summing scores for all match candidates in the merged set and dividing each score by this sum.

In block 310, a second score is computed for each match candidate of the merged set based upon features of that match candidate. In block 312, a classifier is trained based on the features to compute the second score. The classifier is preferably a maximum-entropy classifier. In block 314, features include at least one of keyword specific features, system specific features, and general features. Keyword specific features may include the number of phones and the number of words. System specific features may include system score, rank of the score, and rank of the duration of the match candidate (e.g., based on max or min duration). General features include the number of systems voting, the rank of the duration, the sum of the scores from all three systems, before and after normalization. In one embodiment, continuous scores are converted to discrete values by binning.

In block 316, the first score and the second score are combined to provide a final set of match candidates. Combining may include multiplying the first score and the second score. Other methods of combination may also be employed. The final set of match candidates may be selected based on a predefined discrimination threshold. For example, in one embodiment, match candidates with final scores above a threshold are provided as the final set of match candidates. Other criteria are also contemplated.

Having described preferred embodiments of a system and method for a classifier-based system combination for spoken term detection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for processing a query, comprising:
determining a plurality of different sets of match candidates for a query from an audio collection using a processor, each of the plurality of different sets of match candidates being independently determined from a plurality of different word lattice generation components, each of the plurality of different word lattice generation components providing a different word lattice as a representation of multiple word hypotheses in a directed acyclic graph;
generating a first score for each match candidate;
merging the plurality of different sets of match candidates into a merged set of all match candidates, where overlapping match candidates from different sets are merged into a single match candidate in the merged set;
computing a second score for each match candidate of the merged set based upon features of that match candidate; and
combining the first score and the second score to identify a final set of match candidates with a combined score above a threshold as matches to the query.

2. The method as recited in claim 1, wherein the plurality of different word lattice generation components each include at least one acoustic model, decoding technique, audio segmentation, and training data type.

3. The method as recited in claim 2, wherein the acoustic model includes a Gaussian mixture model or a deep neural network where the first scores are generated by the Gaussian mixture model or deep neural network.

4. The method as recited in claim 2, wherein the decoding technique includes static decoding or dynamic decoding.

5. The method as recited in claim 2, wherein the audio segmentation includes a first audio segmentation based on a speech state, a silence state and a non-transmission state, a second audio segmentation based on the speech state and a non-speech state, or a third audio segmentation based on the speech state and the non-speech state tuned for a desired result.

6. The method as recited in claim 2, wherein the data training type includes noisy data or a combination of noisy and clean data.

7. The method as recited in claim 1, wherein computing the second score includes training a classifier based upon keyword features or system features.

8. The method as recited in claim 7, wherein the keyword features include a number of phones or a number of words.

9. The method as recited in claim 7, wherein the system features include a score, a rank of the score, or a rank of a duration of the match candidate.

10. The method as recited in claim 1, wherein combining the first score and the second score includes multiplying the first score and the second score to provide a final score, selecting final scores to provide the final set of match candidates according to a predefined threshold, and normalizing the combined scores for each match candidate identified for the final set.

11. A method for processing a query, comprising:
determining a plurality of different sets of match candidates for a query from an audio collection using a processor, each of the plurality of different sets of match candidates being independently determined from a plurality of different word lattice generation components, each of the plurality of different word lattice generation components providing a different word lattice as a representation of multiple word hypotheses in a directed acyclic graph, including at least one of acoustic model, decoding technique, audio segmentation, and training data type;
generating a first score for each match candidate;
merging the plurality of different sets of match candidates into a merged set of all match candidates, where overlapping match candidates from different sets are merged into a single match candidate in the merged set;
computing a second score for each match candidate of the merged set by training a classifier based upon at least one of keyword features and system features of that match candidate; and
combining the first score and the second score to identify a final set of match candidates with a combined score above a threshold as matches to the query.

12. The method as recited in claim 11, wherein keyword features include a number of phones or a number of words.

13. The method as recited in claim 11, wherein system features include a score, a rank of the score, or a rank of a duration of the match candidate.

14. The method as recited in claim 11, wherein combining the first score and the second score includes multiplying the first score and the second score to provide a final score, selecting final scores to provide the final set of match candidates according to a predefined threshold, and normalizing the combined scores for each match candidate identified for the final set.

15. A non-transitory computer readable storage medium comprising a computer readable program for processing a query, wherein the computer readable program when executed on a computer causes the computer to perform the steps of:
- determining a plurality of different sets of match candidates for a query from an audio collection using a processor, each of the plurality of different sets of match candidates being independently determined from a plurality of different word lattice generation components, each of the plurality of different word lattice generation components providing a different word lattice as a representation of multiple word hypotheses in a directed acyclic graph;
- generating a first score for each match candidate;
- merging the plurality of different sets of match candidates into a merged set of all match candidates, where overlapping match candidates from different sets are merged into a single match candidate in the merged set;
- computing a second score for each match candidate of the merged set based upon features of that match candidate; and
- combining the first score and the second score to identify a final set of match candidates with a combined score above a threshold as matches to the query.

16. A system for processing an audio query, comprising:
- a keyword search engine module configured to determine a plurality of different sets of match candidates for a query from an audio collection using a processor, each of the plurality of different sets of match candidates being independently determined from a plurality of different word lattice generation components, each of the plurality of different word lattice generation components configured to provide a different word lattice as a representation of multiple word hypotheses in a directed acyclic graph stored on a computer readable storage medium;
- a combination module configured to generate a first score for each match candidate; and merge the plurality of different sets of match candidates into a merged set of all match candidates, where overlapping match candidates from different sets are merged into a single match candidate in the merged set;
- a classifier module configured to compute a second score for each match candidate of the merged set based upon features of that match candidate, and
- the combination module further configured to combine the first score and the second score to identify a final set of match candidates with a combined score above a threshold, as matches to the query.

17. The system as recited in claim 16, the plurality of different word lattice generation components each include an acoustic model, a decoding technique, audio segmentation, or training data type.

18. The system as recited in claim 17, wherein the acoustic model includes a Gaussian mixture model or a deep neural network.

19. The system as recited in claim 17, wherein the decoding technique includes static decoding or dynamic decoding.

20. The system as recited in claim 17, wherein the audio segmentation includes a first audio segmentation based on a speech state, a silence state and a non-transmission state, a second audio segmentation based on the speech state and a non-speech state, or a third audio segmentation based on the speech state and the non-speech state tuned for a desired result.

21. The system as recited in claim 17, wherein the data training type includes noisy data or a combination of noisy and clean data.

22. The system as recited in claim 16, wherein the classifier module is further configured to train a classifier based upon keyword features or system features.

23. The system as recited in claim 22, wherein the keyword features include a number of phones or a number of words.

24. The system as recited in claim 22, wherein the system features include a score, a rank of the score, or a rank of a duration of the match candidate.

25. The system as recited in claim 16, wherein the combination module is further configured to multiply the first score and the second score to provide a final score, select final scores to provide the final set of match candidates according to a predefined threshold, and normalize the combined scores for each match candidate identified for the final set.

\* \* \* \* \*